April 24, 1928.
L. L. SHERWOOD
DENTAL FLOSS HOLDER
Filed June 22, 1927
1,667,134
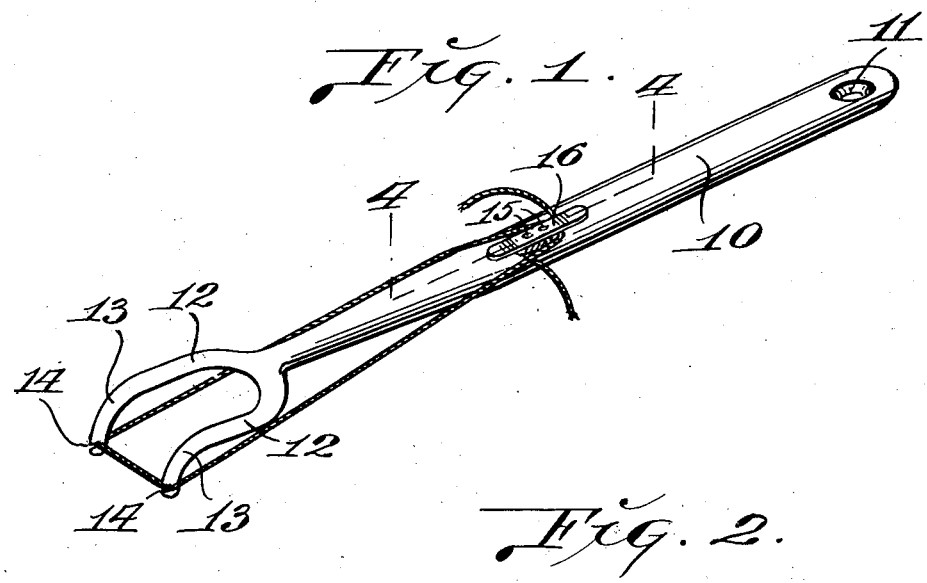
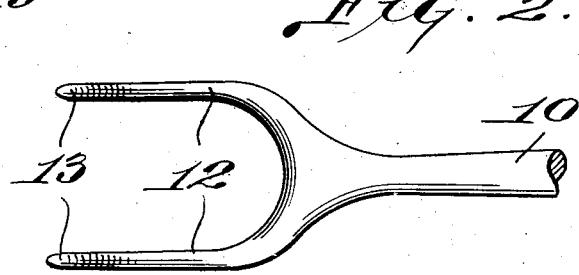
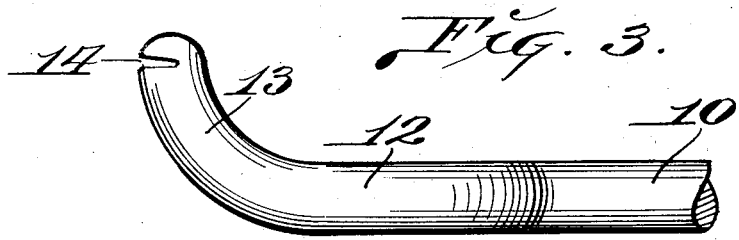
INVENTOR,
LESTER L. SHERWOOD.
By Martin C. Smith atty.

Patented Apr. 24, 1928.

1,667,134

UNITED STATES PATENT OFFICE.

LESTER L. SHERWOOD, OF LOS ANGELES, CALIFORNIA.

DENTAL FLOSS HOLDER.

Application filed June 22, 1927. Serial No. 200,599.

My invention relates to a dental floss holder and has for its principal object, the provision of a relatively simple, inexpensive and practical device, that may be conveniently employed for firmly holding in proper position, a short section of dental floss, so that the latter may be readily passed between the teeth and moved backward and forward, for the purpose of cleaning the teeth.

With the foregoing and other objects in view, my invention consists in certain novel features of construction and arrangement of parts that will hereinafter be more fully described and claimed and illustrated in the accompanying drawing, in which;—

Fig. 1 is a perspective view of a dental floss holder embodying the principles of my invention.

Fig. 2 is an enlarged plan view of the forward end of the device.

Fig. 3 is an enlarged side elevational view of the forward end of the holder.

Fig. 4 is an enlarged detail section taken approximately on the line 4—4 of Fig. 1.

Referring by numerals to the accompanying drawings which illustrate a practical embodiment of my invention, 10 designates a handle having the general shape and size of an ordinary tooth brush and which handle may be formed of celluloid, hard rubber or oleaginous material and formed in the rear end of said handle, is an aperture 11, whereby the device may be suspended on a suitable hook or hanger, while not in use.

The forward end of the handle is bifurcated to provide a pair of short arms 12, that are spaced apart approximately ¾ of an inch or an inch and the outer ends of these arms are curved, as designated by 13.

Formed in the outer sides of the upper ends of the curved portions 13, are notches 14, that gradually decrease in width toward their inner ends and these notches occupy a plane that is substantially parallel with the plane occupied by handle 10.

Secured in any suitable manner, preferably by means of rivets 15, on the intermediate portion of the handle 10, is a short strip or plate 16, of thin, resilient metal, the free ends of which are bent upward to a slight degree, so that they occupy positions just above the surface of the handle.

This plate 16 serves as a clip for securing the end portions of a section of dental floss to the handle of the device and when a section of floss is applied to the holder, one end of said section is engaged beneath one of the resilient end portions of plate 16 and said section of floss is extended to the bifurcated end of the holder and positioned in the notches 14 so that it spans the space between the curved ends of the arms 12. The remaining portion of the section of floss extends rearwardly from the bifurcated end of the holder and the end of this portion of the section of floss is wrapped at least once around the retaining clip 16, beneath the resilient end portions thereof and thus the section of floss is firmly secured to the holder.

In the use of the device, the bifurcated end of the holder is inserted in the mouth and manipulated so that the portion of floss between the curved ends of the arms 12, passes between the teeth and the holder may now be manipulated so as to move the floss backward and forward between the teeth, thereby cleaning same and accomplishing the desired results.

Owing to the curvature of the outer ends of the arms 12, that portion of the dental floss that spans the space between the ends of the curved portions of the arm may be very readily moved into position, so as to pass between the teeth and thus the operation of cleaning the teeth with dental floss is greatly facilitated.

By forming the notches 14 so that they occupy a plane substantially parallel with the plane occupied by the handle 10, those portions of the dental floss that occupy said notches and span the space between the ends of the arms 12, will be prevented from becoming disengaged from the device, while the bifurcated forward end thereof is being moved vertically to position the dental floss in between the teeth, or while said floss is being removed from the teeth.

Thus it will be seen that I have provided a dental floss holder that is relatively simple in construction, inexpensive of manufacture and very effective in performing its intended functions.

It will be understood that minor changes in the size, form and construction of the various parts of my improved dental floss holder may be made and substituted for those herein shown and described, without departing from the spirit of my invention, the scope of which is set forth in the appended claims.

I claim as my invention:

1. A dental floss holder comprising a handle, the forward end of which is bifurcated to provide a pair of spaced arms, the outer portions of which are curved in the same direction, the outer edges of the ends of the curved portions of said arms being provided with notches that occupy a plane parallel with the plane occupied by the handle and a plate of thin, resilient material secured on the handle to the rear of the bifurcated forward end thereof, the end portions of which plate are spaced apart from the surface of the handle.

2. A dental floss holder comprising a handle, a head member which is forked, the outer ends of the forked member extending upward, the outer ends of said upwardly extending members being notched, and a clip of resilient material secured at the mid-section of the said handle.

In testimony whereof I affix my signature.

LESTER L. SHERWOOD.